(12) United States Patent
Hedrick

(10) Patent No.: US 7,659,903 B2
(45) Date of Patent: Feb. 9, 2010

(54) AIRCRAFT FLAT PANEL DISPLAY SYSTEM

(75) Inventor: Geoffrey S. M. Hedrick, Malvern, PA (US)

(73) Assignee: Innovative Solutions & Support, Inc., Exton, PA (US)

( * ) Notice: Subject to any disclaimer, the term of this patent is extended or adjusted under 35 U.S.C. 154(b) by 166 days.

(21) Appl. No.: 11/489,370

(22) Filed: Jul. 18, 2006

(65) Prior Publication Data

US 2007/0013693 A1 Jan. 18, 2007

Related U.S. Application Data

(60) Provisional application No. 60/700,545, filed on Jul. 18, 2005.

(51) Int. Cl.
*G06T 1/00* (2006.01)
*G06F 15/16* (2006.01)

(52) U.S. Cl. .................. 345/522; 345/501; 345/502

(58) Field of Classification Search ............... 345/522, 345/501, 530, 545, 214; 340/971
See application file for complete search history.

(56) References Cited

U.S. PATENT DOCUMENTS

| 6,188,380 | B1 * | 2/2001 | Kawashima et al. | 345/102 |
| 6,600,489 | B2 * | 7/2003 | Cook | 345/426 |
| 6,693,558 | B2 * | 2/2004 | Hedrick | 340/971 |
| 6,791,476 | B1 | 9/2004 | Hedrick | |
| 7,012,553 | B2 | 3/2006 | Hedrick | |
| 2003/0214506 | A1 * | 11/2003 | Koselj et al. | 345/519 |
| 2004/0046712 | A1 | 11/2004 | Naimer et al. | |
| 2005/0220363 | A1 * | 10/2005 | Oldroyd | 382/294 |

FOREIGN PATENT DOCUMENTS

WO   WO 02103292   12/2002

* cited by examiner

*Primary Examiner*—Joni Hsu
(74) *Attorney, Agent, or Firm*—Cohen Pontani Lieberman & Pavane LLP

(57) ABSTRACT

An aircraft cockpit flight deck data display system for displaying, on a viewable display screen, typically anti-aliased graphical imaging data derived from aircraft sensors, generates or receives graphics processing language (GPL) commands that define the information intended for presentation on the display screen. The GPL commands are input to a video graphics processor that is operable to interpret the received GPL commands and to generate therefrom video imaging data transferable to the display screen to populate the screen with the intended information. The same GPL commands are also input to a comparator processor that is operable to interpret the received GPL commands and to generate therefrom selected "points of light", comprising a limited subset of the video imaging data generated by the video graphics processor. The comparator processor-generated "points of light" are then compared to the respective corresponding video imaging data points generated by the video graphics processor to thereby validate the proper operation of the video graphics processor and the accuracy of the video imaging data generated by the video graphics processor.

14 Claims, 3 Drawing Sheets

AIRCRAFT FLAT PANEL DISPLAY SYSTEM

RELATED APPLICATION

This application claims priority from U.S. Provisional Patent Application Ser. No. 60/700,545, filed Jul. 18, 2005, the entire disclosure of which is expressly incorporated by reference herein.

BACKGROUND OF THE INVENTION

1. Field of the Invention

The present invention relates to aircraft cockpit flight deck data display systems and, more particularly, to methods and apparatus for assuring accurate, high integrity rendering of graphically-imaged flight data in an aircraft cockpit display system.

2. Description of the Related Art

U.S. Pat. No. 6,693,558 ("the '558 Patent), the disclosure of which is expressly incorporated by reference herein, describes an aircraft flat panel display system that includes a graphics rendering computer or processor for rendering of anti-aliased graphical imaging data derived from aircraft sensors for full-field imaging on an aircraft cockpit display screen. A comparator processor independently generates, from the same sensor data, a selected subset or "points of light" of the display screen image and compares the "points of light" data to the video data generated by the rendering processor for the same display screen pixel locations. The minimized processing requirements and simplified design of the comparator processor enable ready FAA certification of the comparator processor to meet the FAA's highest, so-called "Level A", certification requirements. The extreme complexity and processing operations required of the rendering processor, on the other hand, make FAA "Level A" certification thereof unusually time consuming and expensive, which seriously inhibits or renders impractical the ability to update or enhance the rendering processor to take advantage of the continuing evolution and advancements in graphics processors and other hardware and software and related technologies if "Level A" certification of the rendering processor is to be maintained. To overcome this disadvantage, the "Level A" certified comparator processor checks a meaningful subset of the video data that is generated by the rendering processor for each display refresh scan to verify the integrity of the display screen image generated by the rendering processor. The rendering processor can therefore be certified to a lower certification level at which periodic changes to the hardware and/or software of the rendering processor to incorporate enhanced technology and/or functionalities, and any required FAA recertification, can be timely accomplished in a practical manner. Thus, the provision and use of the comparator processor, as disclosed in the '558 Patent, obviates the need for the otherwise-required highest level of rendering processor certification that is impractical or unavailable for accommodating technology-driven rendering processor enhancements and facilitates the use of advancements in graphics rendering hardware and software and the like to upgrade and improve the screen-generating abilities and functionality of the rendering processor.

The flat panel display system of the '558 Patent thus advantageously provides a system that can be periodically updated, without impractical certification requirements that would otherwise render the timely updating of an aircraft display system uneconomic or effectively impossible, to incorporate improved graphics processors and other technology advances that enhance and extend its ability to place on an aircraft cockpit display screen critical and other valuable information utilized by pilots in safely operating the aircraft. New aircraft can be outfitted with this system, and existing aircraft can be retrofitted to incorporate the system to replace the cockpit components and/or displays with which they were initially constructed or with which they have thereafter been fitted.

In the '558 Patent, selection of the "points of lights" to be checked by the comparator processor against the corresponding display points generated by the rendering processor is effected by choosing data points located at positions throughout the display field at which data for important aircraft and environmental and situational parameters and indications are being imaged at each periodic refresh of the display. Where for example the display includes a graphically simulated flight instrument—such by way of illustration as a graphical depiction of a conventional mechanical altimeter—one or more "points of light" can be defined at predetermined locations, such as along a graphically-imaged pointer which dynamically changes position with changes of altitude, or at changing locations, from one screen refresh to the next, on or along the imaged pointer. This procedure for selecting the "points of light" necessarily requires advance knowledge of the locations on the screen at which the data for important aircraft and environmental and situational parameters and indications are being imaged—i.e. knowledge of the manner and format in which the display screen images are being presented. See also U.S. Pat. No. 6,791,476 and No. 7,012,553, and copending U.S. patent application Ser. No. 11/054,010 filed Feb. 28, 2005, the disclosures of which are also expressly incorporated by reference herein.

Because selection of the "points of light" is based on advance knowledge of the screen display format in which the aircraft data is presented, display systems constructed in accordance with this technology must closely integrate both the controller for rendering the anti-aliased graphical image to be presented on the display and the check or comparator processor for generating the "points of light". If a user or customer requests modifications in the format or manner of presentation of the aircraft data on the display, both the rendering controller and the comparator processor must be reprogrammed or otherwise modified so that the "points of light" continue to be selected from meaningful locations in the display field. Similarly, the systems and methods of the '558 Patent cannot easily be employed in conjunction with rendering controllers manufactured or designed by third party manufacturers or end users who are understandably reluctant to expose their often proprietary display rendering software and hardware—at least some detailed knowledge of which would be needed to code or configure the comparator processor for generating the "points of light"—to another who is a likely or potential competitor.

OBJECTS AND SUMMARY OF THE INVENTION

It is accordingly an object of the present invention to provide methods and apparatus for assuring the operating integrity of the graphics rendering engine responsible for generating the graphically-imaged data viewable on an aircraft cockpit flight display without the necessity of foreknowledge of the type of information or of the manner or location or format in which the information is depicted on the flight display.

It is another object of the invention to provide methods and apparatus for providing effective ongoing verification of the operating accuracy and integrity of the display system components for operatively interpreting the incoming aircraft data for placement on the display in a manner that facilitates integration and use of the display system with existing third-party devices that provide the aircraft data for presentation to the flight crew by the display system.

These and other objects of the present invention are achieved by providing, inter alia, an improved and display format-independent apparatus, procedures and criteria for selecting the "points of light" which may be implemented in a number of advantageous ways for a variety of applications not easily realized by heretofore known "points of light" selection methods and criteria.

In accordance with an embodiment of the invention, an image display system for displaying, on a viewable display screen, information defined by a plurality of graphics processing language (GPL) commands includes a video graphics processor for receiving the GPL commands that define the information for display on the display screen and operable for interpreting the received GPL commands to generate from the received GPL commands video imaging data representing the information, the generated video imaging data comprising a multiplicity of video imaging data points transferable to the display screen for displaying the information on the display screen; and a comparator processor for receiving the GPL commands that define the information for display on the display screen and operable for interpreting the received GPL commands to generate from the received GPL commands selected "points of light" comprising a limited subset of the multiplicity of video imaging data points generated by the video graphics processor, the comparator processor being further operable for comparing each of the generated "points of light" to a respective corresponding video imaging data point of the video imaging data generated by the video graphics processor to thereby validate the video imaging data generated by and the operation of the video graphics processor.

In accordance with another embodiment of the invention, a method of displaying, on a viewable display screen, information defined by a plurality of graphics processing language (GPL) commands, includes the steps of receiving, by a video graphics processor, the GPL commands that define the information for display on the display screen and interpreting, in the video graphics processor, the received GPL commands to generate from the received GPL commands video imaging data representing the information, the generated video imaging data comprising a multiplicity of video imaging data points transferable to the display screen for displaying the information on the display screen; receiving, by a comparator processor, the GPL commands that define the information for display on the display screen and interpreting, by the comparator processor, the received GPL commands to generate from the received GPL commands selected "points of light" comprising a limited subset of the multiplicity of video imaging data points generated by the video graphics processor; comparing each of the generated "points of light" to a respective corresponding video imaging data point of the video imaging data generated by the video graphics processor to thereby validate the video imaging data generated by and the operation of the video graphics processor; and transferring the generated video imaging data to the display screen to display on the display screen the information defined by the plural GPL commands.

Still other objects and features of the present invention, and of various other contemplated embodiments thereof, will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, in which like reference numerals denote similar elements throughout the several figures.

DETAILED DESCRIPTION OF THE PRESENTLY PREFERRED EMBODIMENTS

Figure 1:
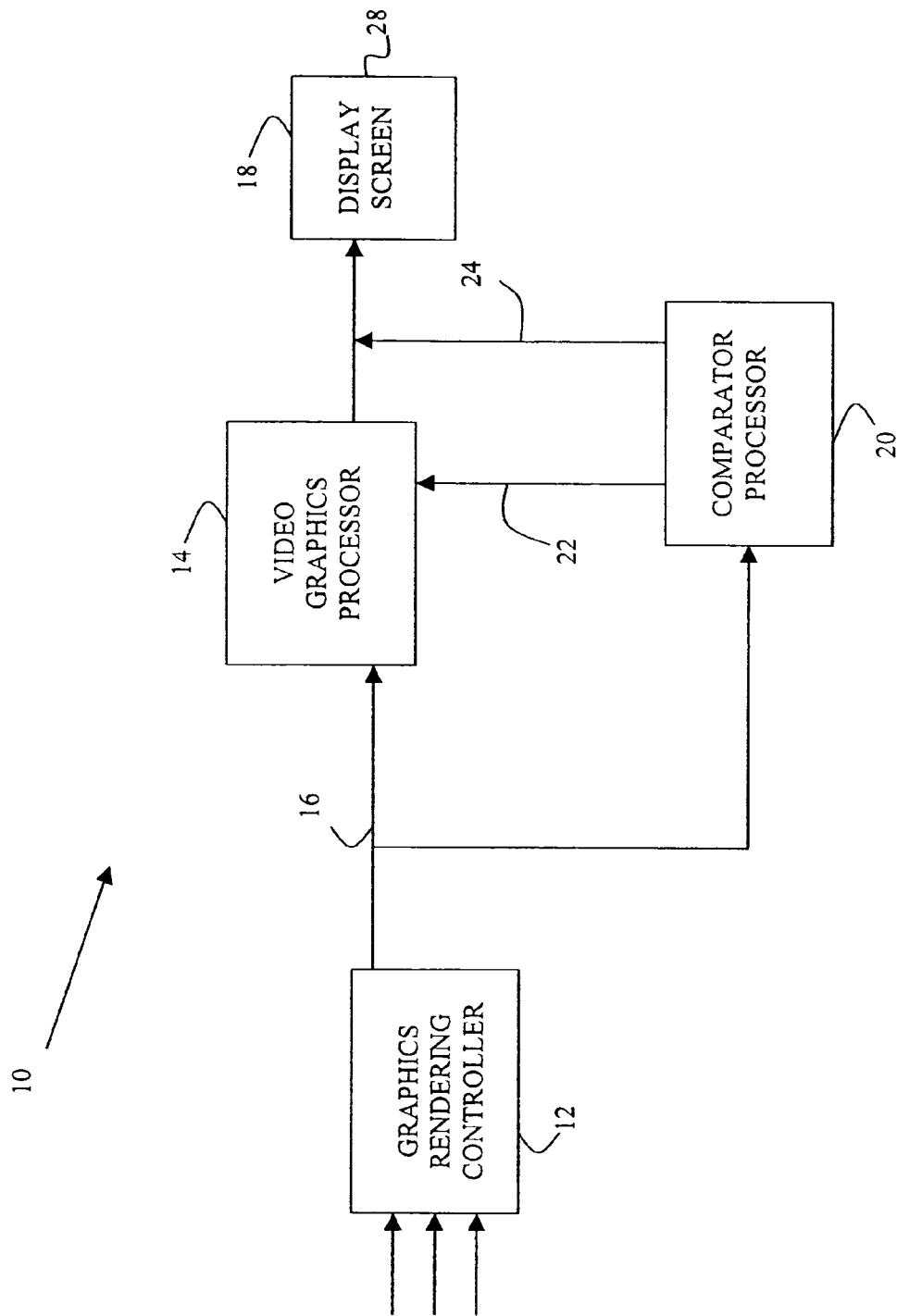
FIG. 1 is a block diagram of one embodiment of a display system constructed in accordance with the present invention.

The present invention is primarily directed to aircraft instrumentation display systems which present, on a typically bit-mapped (e.g. liquid crystal or plasma or other flat panel) display formed of a multiplicity of individually-addressable color pixels at locations throughout the display and actuatable to create images on the display, aircraft flight information based on data that is input to the display system for presentation on the display. Such display systems—upon which aircraft flight deck crew members typically rely in piloting and otherwise monitoring and controlling the aircraft and its numerous systems—must operate with extremely high levels of accuracy, integrity and reliability and, as such, are required by FAA regulations to be certified to the most stringent of standards. The invention advantageously expands the range of available hardware, software and technologies that may be used in such high integrity aircraft systems without diminution of the integrity and reliability and the like that is appropriately required by the FAA and necessitated by the potential consequences of unanticipated system failures. It should nevertheless be understood that the inventive apparatus and methods may also be used in and applied to numerous other environments and applications, as will be apparent to persons of skill having knowledge of this disclosure, and such alternate uses and applications thereof are fully within the intended scope and contemplation of the invention.

The invention takes advantage of the increasingly common use, in high level programming interfaces, of what are sometimes referred to as a Domain Specific Language ("DSL")—i.e. a programming language designed to be useful for a specific set of tasks, in contrast to general purpose programming languages. DSLs are focused on doing one kind of task especially well. In computer graphics processing, Graphic Processing Language ("GPL") DSLs define standardized commands (and associated arguments) that are interpreted by a graphics processor and associated hardware and software to create for display specific graphical objects, shapes, textures, lighting, scaling, etc. GPLs now in common use include OpenGL, DirectX and, in the aircraft industry, ARINC-661. OpenGL may be viewed as a low level or native language set of commands that are directly executable by typical commercial graphics processors, whereas some other DSLs such as DirectX and ARINC-661 operate at a higher protocol level that may require interpretation or analysis by a preprocessor or the like before being input to the graphics processor that generates the rendered display image. Those skilled in the art will in any event recognize that the present invention is applicable to and suitable for use with any such GPL, and it should be understood that the invention is neither intended nor required to be limited to use with any particular GPL, the selection of which will either be dictated by the particular application or as a general matter of design choice.

In accordance with the invention, GPL drawing commands and associated arguments (hereinafter "GPL commands") which are input to a display system are utilized to define and/or develop a set of "points of light" for comparison with predetermined corresponding video display data points or imaging data likewise generated by the video graphics processor from the same GPL drawing commands for presentation on the display.

GPL drawing commands commonly define, inter alia, one or more vertices that instruct the intended image. Thus, for example, a line may be defined by its endpoints; a triangle or polygon by its corners; and a circle by its center and one point or multiple points on its circumference. In accordance with one aspect or embodiment or implementation of the present invention selected ones of these vertices, as defined by the GPL commands that define the intended graphical image to be presented on a display, are utilized to define the "points of light"; by way of illustration, the "points of light" of a GPL-defined line can be one or both vertices, and/or one or more points defined on a line extending between the two vertices. In accordance with another aspect or embodiment or implementation, "points of light" can be selected from within the bounded area of the GPL-defined object or shape; where a GPL-defined line has a specified thickness, for example, a point on the line located inward from its boundaries or periphery can be selected, or a "point of light" within the bounded area of a GPL-defined circle or polygon can be selected. It is generally anticipated that "points of light" selected using combinations of these and other GPL-defined features and parameters, as will be apparent to those of ordinary skill in the art, will be employed in delineating the multiple "points of light" for comparison with the corresponding display screen locations in the operation and use of the inventive systems and methods; such selections may be based on the particular graphical elements being imaged, as a general matter of design choice, and/or any other factor or basis deemed appropriate under the particular circumstances.

Thus, in one implementation or embodiment of the invention, an aircraft flat panel display system generally, for example, based on that disclosed in the '558 Patent comprises a graphics rendering controller and an associated video graphics processor operative for rendering of anti-aliased graphical imaging data derived from aircraft sensors for full-field imaging on a cockpit display screen, and a comparator processor for independently generating, from the same sensor data, a selected subset or "points of light" of the display screen image and for comparing the selected "points of light" data to the corresponding data generated by the video graphics processor for the same display screen pixel locations. The aircraft sensor data is processed by the graphics rendering controller to define GPL commands, and the GPL commands are input to both the video graphics chip or processor (to create from the GPL commands the cockpit display screen full-field image) and the comparator processor (to generate the "points of light" for comparison to the corresponding video graphics processor-generated video data). The "points of light" are selected from or using the graphics primitives and objects and the like which are defined by interpretation of the GPL commands by the comparator processor. The selected "points of light" data generated by the comparator processor are compared to the corresponding data points generated by the video graphics processor from the same GPL commands—and, therefore, inherently for the same display screen pixel locations—to verify the integrity and accuracy of the display screen full-field image prepared by the video graphics processor.

Such a display system 10, constructed in accordance with the present invention, is depicted in FIG. 1. Aircraft signals and sensor data are input to a graphics rendering controller 12. The graphics rendering controller 12 is generally intended to comprise, by way of illustration, a combination of hardware and software for receiving inputs representative of, inter alia, aircraft signal and sensor data and the like and for generating GPL commands interpretable for defining the intended anti-aliased graphical imaging data output defining on a display screen visual representations of aircraft flight instruments, data and parameter values, trends, alarms, images and any other information useful to the flight crew for operation of the aircraft or, if the display screen is intended for use by another person and/or in a different application or environment, information useful to that person and/or for the appropriate application or environment. In any event the particular hardware and/or software forming the graphics rendering controller is, in accordance with the present invention, solely a matter of design choice and, indeed, in some embodiments of the invention the graphics rendering controller is not a part of the inventive apparatus. Thus, the graphics rendering controller may for example comprise a third party or existing aircraft flight management system or mission computer or other device which outputs GPL commands defining the presentation of graphical images on the display and with which a display subsystem apparatus constructed in accordance with the present invention is used for displaying, from the GPL commands output by the graphics rendering controller or the like, the so-rendered graphical images while using the same GPL commands output by the graphics rendering controller or the like to confirm and assure the accuracy and integrity of the displayed images. At the very least, therefore, a graphics rendering controller 12 or other source for use in an implementation of the inventive apparatus or method—whether or not comprising a part of the inventive apparatus—outputs GPL commands that define the intended presentation of graphical images on a display screen. The GPL commands output by the graphics rendering controller 12 will, in accordance with the invention, be interpreted by a video graphics processor—which, in at least some embodiments of the invention, will be a part of the inventive display system—for populating a flat panel or other display screen with images, typically full-screen, anti-aliased, graphical images representing, in for example an aircraft flight deck environment, aircraft operation, status, flight and navigation data and any additional information appropriate or desired for the particular aircraft, application, mode of operation or flight, etc. as a general matter of design choice.

With continued reference to FIG. 1, the GPL output of the graphics rendering controller 12 is directed to a video graphics processor 14 in which the GPL commands are interpreted to define the data which is used to populate the display screen with the intended graphically-presented images. The GPL output of the rendering controller 12 is communicated to the video graphics processor 14 via a wired or wireless link 16, which may by way of example comprise a wired Ethernet link or communications bus. In currently preferred forms of the invention, the video graphics processor 14 may be any suitable general purpose or specialized, off-the-shelf commercial or specially-designed video processor device or chip or generator which is operable for interpreting the GPL commands and for generating or rendering therefrom the images intended, as defined by the GPL commands, for presentation on the display screen. Because the invention provides continuing, dynamically-updated checks on the integrity and operation of the video graphics processor and its associated support circuitry and software, the video graphics processor 14 need not be certified to the FAA's so-called "Level A" standards and, as a consequence, the processor 14 may be selected from among numerous readily available commercial devices to take advantage of the significant processing power and display features of current generation commercial hardware and software and may be periodically replaced and updated to take advantage of continuing rapid advances in graphics processing technology. The video graphics processor may, as is common in such devices, include integral frame buffer memory in which the graphical image to be displayed is assembled, by interpretation of the GPL commands, before the contents of the frame buffer are transferred to the display, or may be utilized in association with a separate memory pool in which the graphical image for display is stored prior to transfer to the display; both are within the intended scope and contemplation of the invention. It is also anticipated that the video graphics processor 14, as depicted in the block diagram of FIG. 1, may as appropriate include additional supporting components to implement the functionality herein described, as will be apparent to persons of ordinary skill.

Where the GPL commands input to the video graphics processor 14 via the communications link 16 comprise OpenGL commands, those commands may be directly interpretable by the processor 14 without substantive preprocessing or analysis since many current commercial video graphics processors utilize OpenGL as the low level or native language commands that are directly executable by such processors. Where on the other hand an other, higher level GPL language is output by the graphics rendering controller 12 or otherwise presented via the communications link 16, on the other hand, a preprocessor or like interpretative or analytical functionality may be required if the video graphics processor cannot natively interpret that GPL language, in which case such functionality may be provided in a separate or associated preprocessor (not shown) located upstream of the video graphics processor 14 or otherwise integrated into the video graphics processor or supporting hardware and/or software as a matter of design choice.

The rendered output of the video graphics processor 14 is directed to a display screen 18, such for example a color flat panel display screen, on which the typically anti-aliased graphical imaging data generated by the video graphics processor is presented for display. It is generally anticipated that the display 18 will be a bit-mapped display formed of a multiplicity of individually-addressable color pixels at locations throughout the display and actuatable to create images on the display, such as a liquid crystal or plasma or other color flat panel screen, although the use of other display hardware and forms and technologies are within the intended scope and contemplation of the invention. For example, as used herein the term display or display screen may denote or identify a head-up display.

A comparator processor 20 is also connected to the communications link 16 and receives therefrom the GPL commands that are output by graphics rendering controller 12 and which are also used by the video graphics processor 14 to generate, through interpretation of the GPL commands, the imaging data for presentation on the display screen 18. The comparator processor is operative for generating, from the same GPL commands from which the graphics rendering controller 12 generates the display screen imaging data, a selected subset (i.e. the "points of light") of the imaging data which is generated by the video graphics processor 14 to populate the display 18 with the intended graphical images. In contrast to the video graphics processor 14, the comparator processor 20 is preferably based on a specialized, custom design and, at least in an aircraft environment application, is intended to be fully certified by the FAA using the most demanding tests and test procedures that are currently required for aircraft data graphical rendering display systems, commonly referred to as modified condition decision coverage (MCDC). The "points of light" are compared to the corresponding display data locations generated by the video graphics processor to thereby continuously assure the integrity, validity, reliability and accuracy of the imaging information generated by the video graphics processor 14, from the graphics rendering controller-output GPL commands, for presentation on the display 18. To be clear, the "points of light"—which are generated by the comparator processor 20 through interpretation of the GPL commands—are compared to the corresponding video data points as generated by interpretation of the same GPL commands by the video graphics processor 14.

In some contemplated embodiments of the invention, the video graphics processor 14 and the comparator processor 20 may be incorporated in or provided as an integrated part of the display 18, as for example in a bezel or housing or mounting frame or assembly or the like of the display.

It is anticipated and contemplated that the comparator processor 20 will include any hardware and/or software required to effect its operating functionality as herein described. By way of example, the comparator processor may incorporate a microprocessor, memory, software programming, and additional support circuitry, although implementations utilizing other and/or additional hardware and/or software and the like may be employed as a general matter of design choice. The specific design and construction of the comparator processor 20 is not in any event a required aspect of the present invention and, so long as the comparator processor provides the functionality described herein, its design and construction are deemed to be matters of design choice well within the normal abilities of those of ordinary skill in the art.

As noted above, the "points of light" are selected from or based on the GPL commands that are received by the comparator processor 20 via the communications link 16. The particular data points, and the manner and process(es) of such selection of the "points of light" by the comparator processor, from the incoming GPL commands is considered to be a general matter of design choice. By way of nonlimiting example, "points of light" can be selected based on fixed or otherwise predetermined points associated with a particular GPL command, or randomly or pseudo-randomly or otherwise variously selected using a statistical approach to estimate an acceptable probability of assuring a correctly interpreted or rendered image using the selected "points of light" subset, or a combination of these or other suitable methods and approaches, all of which are within the intended scope and contemplation of the invention. At least one "point of light" may be selected using each GPL command received by the comparator processor via the communications link 16, or "points of light" may be selected for fewer than all such GPL commands that are received by the comparator processor 20. The selected "points of light" can be the same—or selected or identified in the same manner—for each succeeding comparison cycle (i.e. for each selected "points of light" subset), or can change or vary in whole or in part from one comparison to the next. Moreover, comparison of the currently-selected "points of light" subset with the corresponding video data generated by the video graphics controller 14 can be carried out for each clock or video refresh cycle, or for each x cycles with x being a constant or a changing integer as befits the particular application but, in any event, selected to provide at least the desired level of integrity assurance.

The comparison of the selected GPL-based "points of light" with the corresponding video data points generated by the video graphics controller 14 from the same GPL commands can be implemented in one or a combination of several ways. In accordance with one implementation or embodiment of the invention, the comparison processor 20 will operatively compare each calculated "point of light" with the corresponding video data that the video graphics processor 14 has stored in its integral or associated frame buffer in preparation for uploading of the frame buffer contents to the display 18. For example, the comparator processor 20 can directly access, as shown at 22, the video graphics processor frame buffer memory to perform the intended comparison(s). Comparison of the data points in this manner verifies, inter alia, the correct interpretation by the video graphics processor of the particular GPL command that generated the video data point and which has also been interpreted by the comparator processor to generate the corresponding "point of light". Moreover, comparison of the "points of light" with the corresponding video data points generated by the video graphics processor 14 through comparator processor access to the frame buffer memory provides confirmation of the accuracy of that display data before the contents of the frame buffer are transferred to the display 18 and thereby enables flagging of potentially inaccurate or suspect data at the moment of its display.

In accordance with another implementation or embodiment of the invention, the selected "points of light" are compared with the corresponding video data points generated by the video graphics processor 14 as the contents of the frame buffer are transferred to the display 18, as indicated at 24 in FIG. 1. For example, the comparator processor 20 can include hardware and/or software, or can operate in conjunction with a separate processor and/or hardware and/or software, to operatively compare the selected "points of light" to the contents of the video data stream as it is moved, serially or otherwise, from the frame buffer of the video graphics processor 14 to the display 18. Comparison of the "points of light" to the corresponding video graphics processor-rendered data points in this manner provides additional confirmation of the proper operation of the frame buffer and other and associated functionality of the video graphics processor and related components. Moreover, although the results of this comparison are not known before the video imaging data from the video graphics processor is presented on the display 18, the rapidity of the video refresh cycle avoids the presentation of suspect data on the display for any reasonably perceivable period of time before an appropriate warning or notification can be placed on the display or otherwise activated.

Implementations and embodiments of the invention in which a combination of these different processes for carrying out the comparison of the selected "points of light" generated by the comparator processor 20 with the corresponding video data points generated by the video graphics processor 14 are also contemplated. In such cases it may be deemed desirable to compare some of the "points of light" and rendered display data using one such process and other "points of light" and display data using the other process, as will be apparent to the person of ordinary skill.

One particularly significant practical advantage provided by the present invention is that its functionality is independent of the particulars of the images being presented on the display screen. Because the "points of light" are selected from the GPL commands—which themselves define the appearance of the display screen, including the location(s) of (by way of example) graphically simulated flight instruments, data and parameter values, pointers, charts, approach plates, topographic profiles, video images, and other graphically-presented images and the like—the comparator processor 20 is operative to continuously confirm the integrity of operation of the video graphics processor 14 without regard to the particular location(s) of flight critical and other data on the display or the format or arrangement of that data and other graphical elements on the display. Accordingly, once the comparator processor is certified to meet the FAA's MCDC or "Level A" standards, it will operate to provide its intended integrity-checking functionality in accordance with those standards without further modification and without regard to the type or character of the displayed data or its manner or format or arrangement of presentation on the display or, indeed, without regard to the particulars of construction or operation of the graphics rendering controller 12 or the like which generates the GPL commands that, when interpreted by a display system, define the appearance of and graphical images for presentation on the display screen. Any aspect of the image presented on the display screen 18—from the type or character of data or images, to the location of the data or images, and the format or "look and feel" of the graphically-defined screen display image, for example—can be changed repeatedly and at will by modification or substitution or replacement of the graphics rendering controller 12 or other GPL commands-generating or supplying device without the need to modify or recertify the comparator processor 20 and without affecting or sacrificing the hardware and data integrity and accuracy confirming functionality provided by the present invention.

Figure 2:
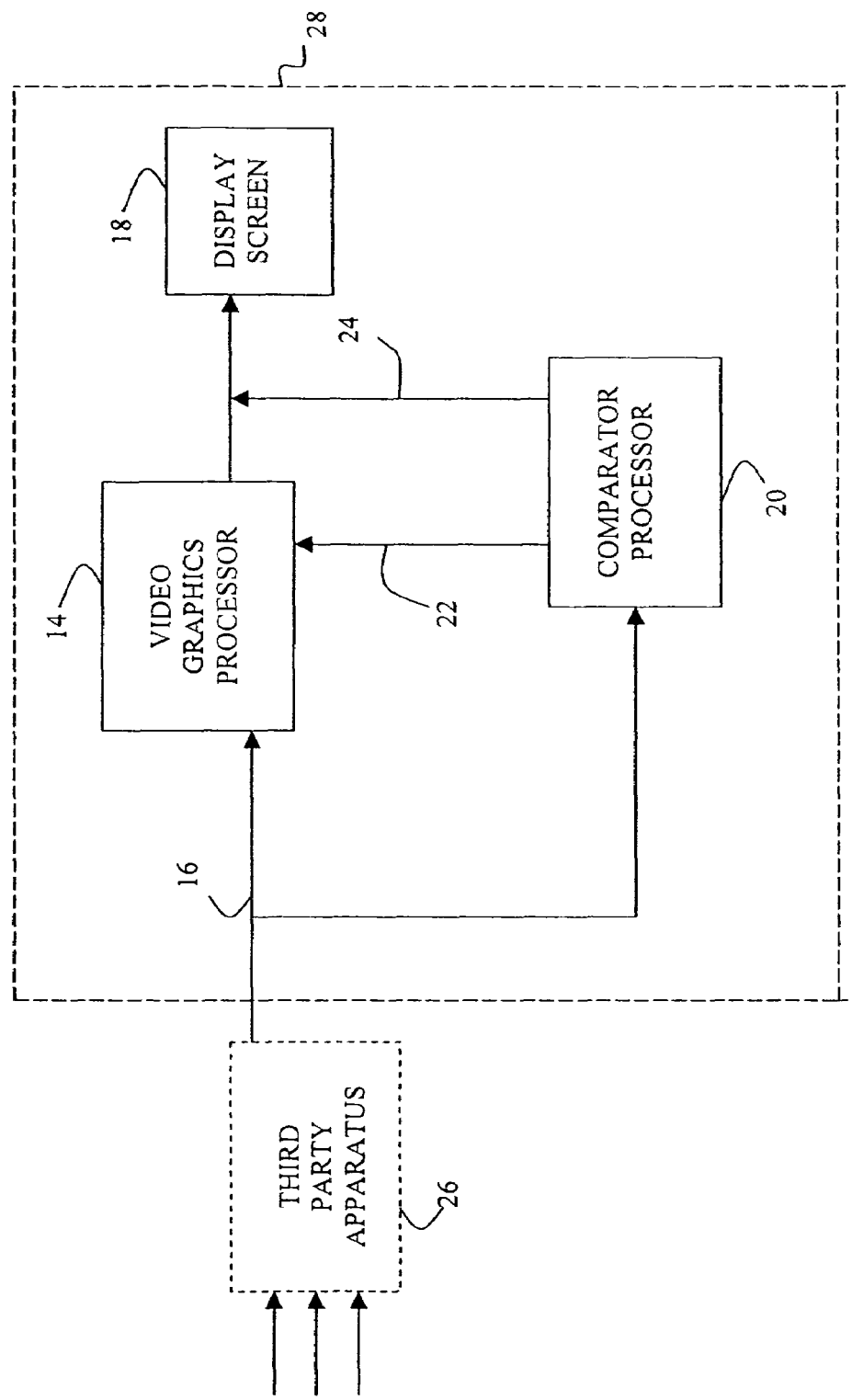
FIG. 2 is a block diagram of another embodiment of a display system in accordance with the invention.

In an implementation or embodiment of the present invention shown in FIG. 2, the video graphics processor 14 and comparator processor 20 may be provided—optionally as an integral or integrated or otherwise associated part of a display screen 18 or display screen housing or bezel or the like, as is preferred—for use with a third-party or otherwise separate apparatus 26 that operatively generates and outputs graphical imaging data (by way of example derived from aircraft sensors) for imaging on a cockpit display screen. This combination of elements 28, including by way of optional example the display 18, is shown in FIG. 2. The comparator processor 20—which is certified to FAA MCDC or "Level A" integrity standards and generates from the GPL commands "points of light" for comparison with corresponding imaging data points generated by the video graphics processor 14 from the same GPL commands for presentation on a cockpit display screen 18—may be constructed to operate in the manner generally disclosed hereinabove. Such a third-party apparatus, as for example a Mission Computer or a Flight Management System, may (as is common) either receive or internally generate OpenGL (or other GPL) commands. Thus, in this embodiment the Mission Computer or Flight Management System or other third party or otherwise existing apparatus 26, which is not an element of the present invention, performs the essential functionality of the graphics rendering controller 12 depicted in FIG. 1—i.e. supplying of the GPL commands that define the intended image for presentation on a display screen 18. In accordance with this implementation of the invention, the GPL commands output from the third party apparatus 26 are directed, via the communications link 16, to both the video graphics processor 14 in which the graphical imaging data for presentation on the display 18 is generated from the GPL commands and to the comparator processor 20 which generates the "points of light" from the same GPL commands, and those "points of light" are then compared with the corresponding display screen video data points as described hereinabove. If the comparison is successful, then the graphical imaging data is directed to the display screen, for example at the next clock or screen refresh cycle where the comparison is made via comparator processor access to the frame buffer of the video graphics processor 14; if not, an alarm indication may be generated. Alternatively, the graphical imaging data generated by the video graphics processor 14 is directed to the display screen, the comparison with the "points of light" taking place as the video imaging data is transferred from the video graphics processor frame buffer to the display 18 and an alarm condition, if necessary, being generated in the succeeding clock cycle or as otherwise appropriate. As discussed above, a selected concurrent combination of these two data comparison techniques is also within the intended scope and contemplation of the invention.

This FIG. 2 implementation of the present invention presents particular advantages to a maker or supplier of such a third-party apparatus 26. By thus utilizing the combined functionality of a commercial video graphics processor 14 and the comparator processor 20 of the invention with a third-party apparatus 26 that generates GPL commands to define the intended presentation of imaging data on a display, the third-party apparatus obtains the significant benefits of access to FAA-permissible use of extremely powerful, low cost, readily available commercial video graphics processors exhibiting functionality not otherwise available in custom-designed, MCDC-certifiable devices requiring considerable time and resources to develop and produce, the ability to periodically update the video graphics processor being utilized to benefit from continuing advances in video processing and display technologies, and the hardware and data accuracy and integrity checks provided by the functionality associated with the comparator processor 20. The maker of the third party apparatus 26 also avoids the need to carry out expensive and time consuming development and certification of a display system for rendering the GPL-based output of its apparatus, while maintaining full flexibility to selectively update and modify the apparatus 26 without affecting the ability of its apparatus to properly interoperate with the inventive display system 28.

The present invention as thus utilized in the foregoing implementation also, as discussed above, advantageously provides its functionality without regard to the particular data presented or its intended location or format or arrangement on the display screen 18—as determined solely by the third-party apparatus 26—or to the particulars of construction or operation of the third-party apparatus. So long as the third-party apparatus outputs to the comparator processor 20 the GPL commands from which the video graphics processor 14 can generate the imaging data for presentation on the display 18, the comparator processor will operatively generate appropriate "points of light" for comparison with the screen display imaging data generated from those same GPL commands by the video graphics processor 14. The present invention thus places no demands or requirements on the third-party apparatus 26 with respect to the imaged format of the display screen or the type, content or location of either fixed, moving, constant or dynamically-changing data and images that are to be presented on the display 18.

Figure 3:
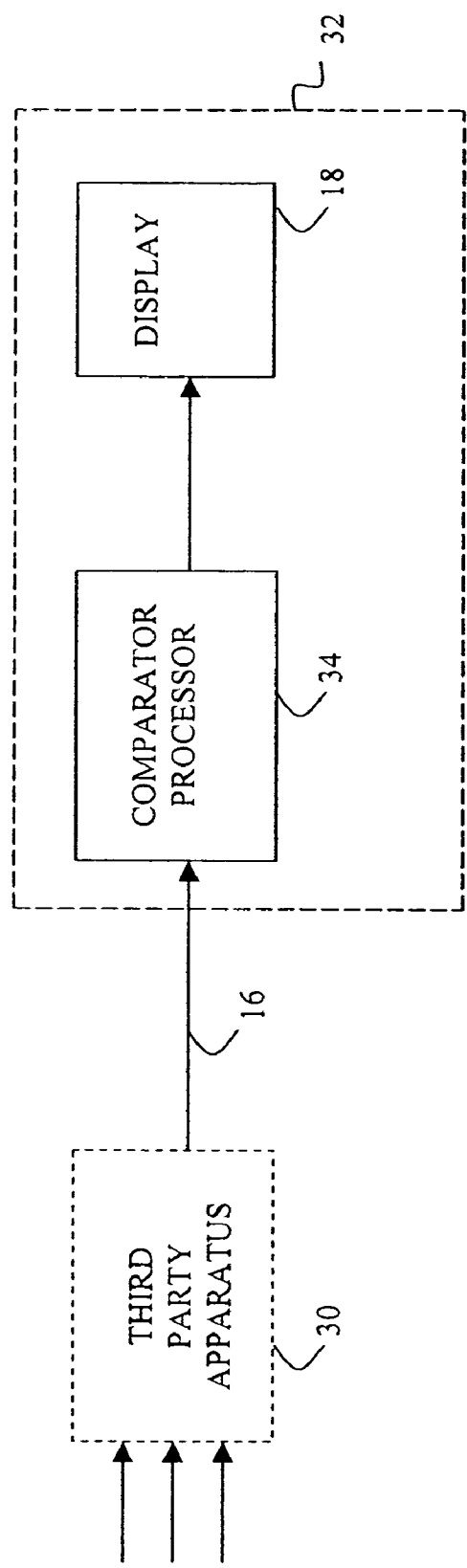
FIG. 3 is a block diagram of still another embodiment of a display system in accordance with the invention.

The latter implementation of the invention may also be employed in conjunction with similar third party apparatus 30 which, in addition to receiving or generating or outputting the GPL commands that define the presentation of imaged data on the display, additionally interprets the GPL commands to generate or render the images for presentation on the display—i.e. where the apparatus 30 also provides the rendering functionality of the video graphics processor 14 of the systems of FIGS. 1 and 2. In such cases the inventive system 32 shown in FIG. 3 may comprise only a comparator processor 34 or, where as is preferred the comparator processor is integrated into the display screen housing or bezel or package or the like, may also include the display 18. Thus, the third party apparatus 30 outputs, for example on the communications link or bus 16, both the GPL commands and graphical video imaging data derived from those GPL commands for directly driving and presentation on a cockpit display screen. As seen in FIG. 3, both the GPL commands and the rendered graphical video imaging data from the third party apparatus 30 are received by the comparator processor 34 via the communications link 16. The comparator processor uses the GPL commands to generate the "points of light" and compares them to the corresponding display screen data points in the graphical imaging data that is output by the third party apparatus 30. The comparator processor 34 may in this embodiment incorporate frame buffer memory for storing each screen data update received via the communications link 16 from the third party apparatus 30, so that the selected "points of light" generated by the comparator processor may be compared to the corresponding video data points in the frame buffer before the buffer is emptied to transfer the image data to the display screen. The comparator processor 34 may instead or in addition compare all or some of the "points of light" to the corresponding video data points as the image data is transferred to the display. In any event, the graphical imaging data received by the system 32 from the third party apparatus 30 is transferred to the display 18, either after the comparison or in the course of the comparison, or as a combination thereof, as described hereinabove.

This further implementation of the invention enables a maker or supplier of a third party apparatus 30 to implement a graphics rendering subsystem of its apparatus—i.e. that part of the apparatus 30 which interprets the GPL commands and generates therefrom the graphical imaging data for presentation on the display 18—without having to certify that subsystem to the otherwise required FAA "Level A" standards, because the inventive comparator processor arrangement of the system 32 will provide appropriate checks on the integrity and accuracy of the third party's graphics rendering subsystem. This permits the maker of the third-party apparatus to, by way of example, more frequently update its graphics hardware and/or software to take advantage of technological advances and increased functionality and capabilities, and/or to utilize commercial off-the-shelf—as contrasted with custom design—video graphics processing chips and the like, without the impractical and often unattainable need to repeatedly carry out full FAA MCDC or "Level A" certification testing and demonstrate complete hardware and software heritage for each iteration or update of the third party apparatus.

It is as noted above also contemplated that a comparator processor for use with a third party apparatus 30 can be constructed and supplied separate from and independent of a conventional or other display screen, for interposition between the third-party apparatus and the display. In this case too the comparator processor 34 will receive from the third-party apparatus 30 both the GPL commands as well as the fully-rendered graphical imaging data for screen display so that the comparator processor may, in addition to generating the "points of light", compare the generated "points of light" to the corresponding display screen data points generated by the third-party apparatus. (Similarly, an implementation comprising both a comparator processor 20 and a video graphics processor 14, for use with a third party apparatus 26, may likewise be constructed and supplied separate from and independent of a conventional or other display screen, for interposition between the third-party apparatus and the display.) This particular arrangement is especially useful in providing a ready retrofit in an aircraft already incorporating such a third-party apparatus 30 (or 26) and an associated display screen, as in many instances the only significant modification required to realize the important advantages of the present invention is to interpose the comparator processor 34 (or the combination of the comparator processor 20 and the video graphics processor 14) between the existing third-party apparatus and the existing display screen.

A variety of modifications of the apparatus and methods herein described are within the intended scope and contemplation of the invention and, like those variations and alternatives already described, may be applied to any implementations and embodiments of the invention as a general matter of design choice. For example, the embodiments of the inventive apparatus depicted in FIGS. 1, 2 and/or 3 may omit the display 18 which can be separately supplied for use with the inventive apparatus and/or methods. The inclusion of these and other such variations and changes may be made by those skilled in the art without departing from the spirit and intended scope of the invention.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. In an image display system for displaying, on a viewable display screen, information defined by a plurality of graphics processing language (GPL) commands,
    a video graphics processor for receiving the GPL commands that define the information for display on the display screen and operable for interpreting the received GPL commands to generate from the received GPL commands video imaging data representing the information, said generated video imaging data comprising a multiplicity of video imaging data points transferable to the display screen for displaying the information on the display screen; and
    a comparator processor for receiving the GPL commands that define the information for display on the display screen and operable for interpreting the received GPL commands to generate from the received GPL commands selected points of light comprising a limited subset of said multiplicity of video imaging data points generated by said video graphics processor, said comparator processor being further operable for comparing each of said generated points of light to a respective corresponding video imaging data point of said video imaging data generated by said video graphics processor to thereby validate the video imaging data generated by and operation of said video graphics processor,
    wherein the points of light are selected without regard to the information defined for display.

2. In an image display system in accordance with claim 1, wherein said video graphics processor and said comparator processor are integrated with the display screen.

3. In an image display system in accordance with claim 1, further comprising a frame buffer of said video graphics processor for storing the video imaging data generated by the video graphics processor in advance of transferring the generated video imaging data to the display screen, wherein said comparator processor is operable for accessing the generated video imaging data stored in the frame buffer for comparing said each generated point of light to the respective corresponding video imaging data point of said generated video imaging data stored in said frame buffer.

4. In an image display system in accordance with claim 1, further comprising a graphics rendering controller for generating the plural GPL commands that define the information to be displayed on the display screen.

5. In an image display system in accordance with claim 4, further comprising a communications link connecting the graphics rendering controller to said video graphics processor and to said comparator processor for communicating the plural GPL commands generated by said graphics rendering controller to said video graphics processor and to said comparator processor.

6. In an image display system in accordance with claim 1, the display system further comprising the display screen.

7. In an image display system in accordance with claim 6, wherein said display screen, said video graphics processor, and said comparator processor are integrated with said display screen.

8. In an image display system in accordance with claim 1, wherein each of the points of light generated by said comparator processor comprises a video image data point defined by one of the plural GPL commands.

9. A method of displaying, on a viewable display screen, information defined by a plurality of graphics processing language (GPL) commands, comprising the steps of:
    receiving, by a video graphics processor, the GPL commands that define the information for display on the display screen and interpreting, in the video graphics processor, the received GPL commands to generate from the received GPL commands video imaging data representing the information, said generated video imaging data comprising a multiplicity of video imaging data points transferable to the display screen for displaying the information on the display screen;
    receiving, by a comparator processor, the GPL commands that define the information for display on the display screen and interpreting, by the comparator processor, the received GPL commands to generate from the received GPL commands selected points of light comprising a limited subset of said multiplicity of video imaging data points generated by said video graphics processor;
    comparing each of said generated points of light to a respective corresponding video imaging data point of said video imaging data generated by said video graphics processor to thereby validate the video imaging data generated by and operation of said video graphics processor; and
    transferring the generated video imaging data to the display screen to display on the display screen the information defined by the plural GPL commands, wherein the points of light are selected without regard to the information defined for display.

10. A method of displaying in accordance with claim 9, further comprising the step of storing the video imaging data generated by the video graphics processor in a frame buffer, wherein said step of comparing comprises comparing said each generated point of light to the respective corresponding video imaging data point of said video imaging data generated by said video graphics processor by accessing said generated respective corresponding video imaging data point stored in the frame buffer, and wherein said step of transferring comprising transferring the generated video imaging data from said frame buffer to the display screen to display on the display screen the information defined by the plural GPL commands.

11. A method of displaying in accordance with claim 9, wherein said step of comparing comprises comparing said each generated point of light to the respective corresponding video imaging data point of said video imaging data generated by said video graphics processor as said generated video imaging data is transferred to the display screen to display on the display screen the information defined by said plural GPL commands.

12. A method of displaying in accordance with claim 9, further comprising the step of generating the plural GPL commands that define the information to be displayed on the display screen.

13. A method of displaying in accordance with claim 9, wherein said step of comparing comprises comparing, of said each generated point of light to the respective corresponding video imaging data point of said generated video imaging data, by said comparator processor.

14. A method of displaying in accordance with claim 9, wherein the video imaging data generated by the video graphics processor comprises anti-aliased graphical imaging data for populating the display screen with graphically-depicted aircraft operating information defined by the plural GPL commands.

\* \* \* \* \*